United States Patent
Schwarz et al.

(10) Patent No.: US 7,577,285 B2
(45) Date of Patent: Aug. 18, 2009

(54) METHOD AND DEVICE FOR EVALUATION OF JOINTING REGIONS ON WORKPIECES

(75) Inventors: Joachim Schwarz, Andelfingen (CH); Martin Halschka, Singen (DE)

(73) Assignee: Precitec Vision GmbH & Co. KG, Eschborn (DE)

( * ) Notice: Subject to any disclaimer, the term of this patent is extended or adjusted under 35 U.S.C. 154(b) by 857 days.

(21) Appl. No.: 10/495,720

(22) PCT Filed: Nov. 14, 2002

(86) PCT No.: PCT/CH02/00613

§ 371 (c)(1),
(2), (4) Date: May 14, 2004

(87) PCT Pub. No.: WO03/041902

PCT Pub. Date: May 22, 2003

(65) Prior Publication Data

US 2005/0041852 A1  Feb. 24, 2005

(30) Foreign Application Priority Data

Nov. 15, 2001 (CH) .................................... 2101/01

(51) Int. Cl.
*G06K 9/00* (2006.01)
*H04N 9/47* (2006.01)
*B23K 9/28* (2006.01)

(52) U.S. Cl. .................... 382/141; 382/108; 219/602; 219/612; 219/97; 348/61; 348/86; 348/90

(58) Field of Classification Search ................ 382/141, 382/266, 100, 103, 108, 149–152; 219/602–604, 219/612–617, 57–58, 86.9, 97–102, 121.63, 219/121.83, 136; 348/61, 86–88, 90–92, 348/125–132
See application file for complete search history.

(56) References Cited

U.S. PATENT DOCUMENTS 3,005,912 A * 10/1961 Babcock ...................... 219/109

(Continued)

FOREIGN PATENT DOCUMENTS

DE       44 08 226 A1    3/1994

(Continued)

OTHER PUBLICATIONS

Eric C. Fox, Jerry Hynecek and Douglas R. Dykaar, "Wide-Dynamic-Range Pixel with Combined Linear and Logarithmic Response and Increased Signal Swing", 2000, Proceedings of SPIE vol. 3965, pp. 4-10.*

(Continued)

*Primary Examiner*—Daniel G Mariam
*Assistant Examiner*—Manav Seth
(74) *Attorney, Agent, or Firm*—McCormick, Paulding & Huber LLP

(57) ABSTRACT

A method and apparatus for detecting a joint between workpieces is provided. At least one light line is recorded by the light section method to detect the three-dimensional course of the joint and a grey-level image of the joint is also recorded. The grey-level image is evaluated to assess the quality of the joint.

19 Claims, 2 Drawing Sheets

U.S. PATENT DOCUMENTS

| | | | | |
|---|---|---|---|---|
| 3,345,563 | A * | 10/1967 | Wood | 324/225 |
| 4,242,702 | A * | 12/1980 | Kuni et al. | 348/133 |
| 4,305,096 | A * | 12/1981 | Yokoshima et al. | 348/90 |
| 4,306,144 | A * | 12/1981 | Masaki | 219/124.34 |
| 4,410,787 | A * | 10/1983 | Kremers et al. | 219/124.34 |
| 4,567,347 | A * | 1/1986 | Ito et al. | 219/124.34 |
| 4,567,348 | A * | 1/1986 | Smith et al. | 219/124.34 |
| 4,734,766 | A * | 3/1988 | Shiozumi et al. | 382/141 |
| 4,806,732 | A * | 2/1989 | Abshire et al. | 219/124.34 |
| 4,833,381 | A * | 5/1989 | Taft et al. | 318/577 |
| 4,849,679 | A * | 7/1989 | Taft et al. | 382/151 |
| 4,854,724 | A * | 8/1989 | Adams et al. | 374/5 |
| 4,863,268 | A * | 9/1989 | Clarke et al. | 348/128 |
| 4,877,940 | A * | 10/1989 | Bangs et al. | 219/124.34 |
| 4,922,174 | A * | 5/1990 | Pietrzak et al. | 219/124.34 |
| 4,951,218 | A * | 8/1990 | Okumura et al. | 219/124.34 |
| 5,038,292 | A * | 8/1991 | Okumura et al. | 219/124.34 |
| 5,039,868 | A * | 8/1991 | Kobayashi et al. | 250/559.08 |
| 5,040,125 | A * | 8/1991 | Okumura et al. | 219/124.34 |
| 5,078,496 | A * | 1/1992 | Parker et al. | 356/613 |
| 5,150,175 | A * | 9/1992 | Whitman et al. | 356/429 |
| 5,189,514 | A * | 2/1993 | Roden | 382/141 |
| 5,275,327 | A * | 1/1994 | Watkins et al. | 219/124.34 |
| 5,506,386 | A * | 4/1996 | Gross | 219/121.64 |
| 5,533,146 | A * | 7/1996 | Iwai | 382/150 |
| 5,614,116 | A * | 3/1997 | Austin et al. | 219/124.34 |
| 5,648,619 | A * | 7/1997 | Gustafsson et al. | 73/865.8 |
| 5,877,960 | A * | 3/1999 | Gross et al. | 219/121.63 |
| 5,978,090 | A * | 11/1999 | Burri et al. | 356/613 |
| 6,024,273 | A * | 2/2000 | Ludewig et al. | 228/103 |
| 6,049,059 | A * | 4/2000 | Kim | 219/124.34 |
| 6,175,107 | B1 * | 1/2001 | Juvinall | 250/223 B |
| 6,204,469 | B1 * | 3/2001 | Fields et al. | 219/121.6 |
| 6,261,701 | B1 * | 7/2001 | Fields, Jr. | 428/577 |
| 6,299,050 | B1 * | 10/2001 | Okamura et al. | 228/110.1 |
| 6,403,918 | B1 * | 6/2002 | Fields et al. | 219/121.64 |
| 6,455,803 | B1 * | 9/2002 | Fields et al. | 219/121.63 |
| 6,476,344 | B1 * | 11/2002 | Fields et al. | 219/121.63 |
| 6,479,786 | B1 * | 11/2002 | Fields et al. | 219/121.63 |
| 6,545,247 | B2 * | 4/2003 | Mukasa et al. | 219/121.63 |
| 6,563,575 | B1 * | 5/2003 | Nichols et al. | 356/237.1 |
| 6,595,403 | B2 * | 7/2003 | Okamura et al. | 228/112.1 |
| 6,791,057 | B1 * | 9/2004 | Kratzsch et al. | 219/121.63 |
| 6,909,462 | B1 * | 6/2005 | Shinotsuka et al. | 348/308 |
| 6,909,799 | B1 * | 6/2005 | Wildmann et al. | 382/152 |
| 6,920,238 | B1 * | 7/2005 | Chen et al. | 382/128 |
| 6,937,329 | B2 * | 8/2005 | Esmiller | 356/237.2 |
| 7,268,866 | B2 * | 9/2007 | Messler | 356/237.1 |
| 2002/0027155 | A1 * | 3/2002 | Okamura et al. | 228/112.1 |
| 2004/0026381 | A1 * | 2/2004 | Tsukamoto et al. | 219/121.6 |

FOREIGN PATENT DOCUMENTS

| | | |
|---|---|---|
| DE | 43 12 241 A1 | 10/1994 |
| JP | 10123057 A * | 5/1998 |
| JP | 10154014 A * | 6/1998 |
| JP | 2001287064 A | 10/2001 |
| WO | WO 9944784 A1 * | 9/1999 |

OTHER PUBLICATIONS

International Search Report for PCT/CH02/00613 dated Feb. 17, 2003.

* cited by examiner

METHOD AND DEVICE FOR EVALUATION OF JOINTING REGIONS ON WORKPIECES

Applicants hereby claim foreign priority benefits under 35 U.S.C. §119 of Swiss Patent Application No. 2101/01 filed Nov. 15, 2001 and PCT Application No. PCT/CH02/00613 filed Nov. 14, 2002, the disclosures of which are herein incorporated by reference.

BACKGROUND OF THE INVENTION

1. Technical Field

The invention relates to methods for detecting joints between workpieces, and also to an apparatus for detecting a joint between workpieces. The invention further relates to apparatus and methods for seam tracking.

2. Background Information

When materials are joined together, particularly by welding though also by adhesive bonding, the problem of detecting the joint arises. This is true in the case of both spot joints (spot welds, spot bonds) and linear joints (weld seam, adhesive bead). Detection may take place both before and after the joining process, and is here understood as meaning on the one hand ascertainment of the position, and on the other hand ascertainment of the condition or quality, of the joint. Thus welding processes with a small heat-affected zone (beam welding, in particular laser beam welding) in which the parts to be joined are butted together require a seam tracking system to detect the position of the joint in order that the beam can be made to follow exactly the dividing line between the workpiece components during welding. Especially when welding butted together metal sheets to form "tailored blanks" (Platinen), it is necessary to have very precise beam tracking to detect the dividing line between the workpieces even when the components are cut exactly to size and the gap between the workpieces is very small or non-existent. This also needs to be assured when sheet-metal parts of equal thickness are welded together, so that no jump in thickness occurs at the dividing line as happens when sheets of different thickness are joined together. It is also necessary that edge damage to the parts should be detected, as it is not possible to obtain a high-quality weld seam between edges that are damaged.

An evaluation of the joint also needs to be carried out after the joining process. For example, a weld seam needs to be evaluated as to quality and/or for the presence of weld defects. Laser-welded tailored blanks which are formed into shaped parts, and also tubes, especially tubes made from sheet-metal components and intended for hydroforming-so-called tailored tubes should be subjected to a 100% inspection of the weld seam.

High rates of travel and field conditions have led to the use of contactless detection systems. These must reliably detect the edges of the tailored blanks for welding, even under the conditions which have been mentioned, and must monlor the misalignment and edge quality of the tailored blanks; and they must also measure geometrical data such as convexity, concavity and edge misalignment to ensure that ISO limits are not exceeded. And besides geometrical data, local defects like porosity, small holes and incomplete penetration should also be found in order that the quality of the seams can be assured.

To distinguish the edges during detection of position, it is customary to use the so-called light section method in which a light beam, e.g., a laser beam, is placed across the joint line and its offset or change of direction is detected. In VDI Berichte No. 1572, 2000, P. Dillinger, A. Horn, K.-H. Noffz, High-speed detection of geometry in laser welding by means of apparatus for detecting a joint between workpieces, field programmable gate array (FPGA) processors, a laser line is placed across the weld seam and recorded by means of a complimentary metal oxide semiconductor (CMOS) camera. To place and evaluate light sections at short intervals, a scanning frequency of 500 Hz is adopted. Visual inspection of the windows for the laser lines is performed with a grey-level image under incident illumination, but the image is produced only in strips and therefore has a scanning frequency of only 16 Hz, and, as stated, serves only as a check of the light section process.

There is a commercially available sensor system for detecting the dividing line between butted-together parts ahead of the welding point (TRUMPF TNS seam sensing system, TRUMPF Lasertechnik GmbH) that uses a light section projector and a charge coupled device (CCD) camera, a video image again being recorded with incident illumination. The video image is evaluated according to brightness signal and its derivative to determine the position of the butt joint, which can also be performed by the light section method. For matt workpiece surfaces, it is suggested that the incident-illumination image and the light section projection should be superimposed, so that the lateral position of the butt joint can be determined by grey-level image evaluation and the vertical misalignment can be detected by light-section evaluation. DE-A4312241 likewise describes a position detection by the light section method and grey-level evaluation of an image obtained by a two-dimensional CCD array, with light-section and grey-level evaluation conducted intermittently. It is also known to use the light section method for detecting the joint, such as the weld seam, after the joining process.

BRIEF SUMMARY OF THE INVENTION

The first fundamental problem of the invention is to provide an improved method for detecting joints.

This is solved, with the method of the kind stated at the outset, by evaluating the grey-level image to assess the quality of the joint.

The effect of this novel use of the grey-level image not just for position detection but for quality inspection of the joint is to improve inspection of the joint.

When detecting position, the grey-level image can be evaluated to detect edge damage and to measure the gap width. Preferably, however, the method is used after the joining process, particularly for the evaluation of weld seams. Also preferred is the use as sensor of a CMOS sensor arrangement, preferably a single CMOS sensor, which at low illumination intensity has a substantially linear characteristic, and at higher illumination intensities has a characteristic departing from linear, preferably a curved and at best logarithmic characteristic, as this markedly improves the recording of the grey-level image with its illumination, which is preferably a dark-field illumination, and of the light pattern of the light section method by the sensor, and/or the separation of these image components in the evaluation. Instead of, or in addition to, a grey-level image, a colour image can be recorded, allowing additional separation owing to the different wavelengths of the two light sources. Evaluation of weld seam quality is preferably effected by detecting features of the surface structure of the weld seam from the image, e.g. by analysing contour lines. The absence of specific features is then interpreted as e.g. denoting poor quality.

A further fundamental problem of the invention is to provide an apparatus for evaluating joints.

This is solved in the apparatus for detecting a joint between workpieces, with a light line projection unit and a recording unit for recording the light line and a grey-level image, and with an image evaluation unit for the light line and the grey-level image, characterized in that the image evaluation unit is configured to detect quality features of the joint from the grey-level image.

This yields the advantages described above; and embodiments of the apparatus corresponding to the preferred method-variants are preferably used.

Yet another fundamental problem of the invention is to improve and to simplify detection of the position of the joint, particularly before the joint is made, that is to say in the case of welding, detection of the edges in order to guide the welding beam.

This is solved by a method for detecting a joint between workpieces before they are joined, in order to control a welding beam making the joint, wherein at least one light line is recorded by the light section method to detect the three-dimensional course of the joint and a grey-level image of the joint is also recorded, characterized in that the recording of the at least one light line (produced in particular by laser) of the light section method is made by means of a non-linear, in particular logarithmic, sensor characteristic, and in that the grey-level image is recorded by a sensor with a substantially linear characteristic, and by an apparatus for detecting a joint between workpieces, with a light line projection unit and a recording unit for recording the light line and a grey-level image, and with an image evaluation unit for the light line and the grey-level image, characterized in that the recording unit has a non-linear, in particular logarithmic, sensor characteristic for the light line, and a substantially linear characteristic for the grey-level image.

BRIEF DESCRIPTION OF THE DRAWINGS

Embodiments of the invention will now be described in detail by way of example, with the help of the drawings, in which.

DETAILED DESCRIPTION OF THE INVENTION

Figure 1:
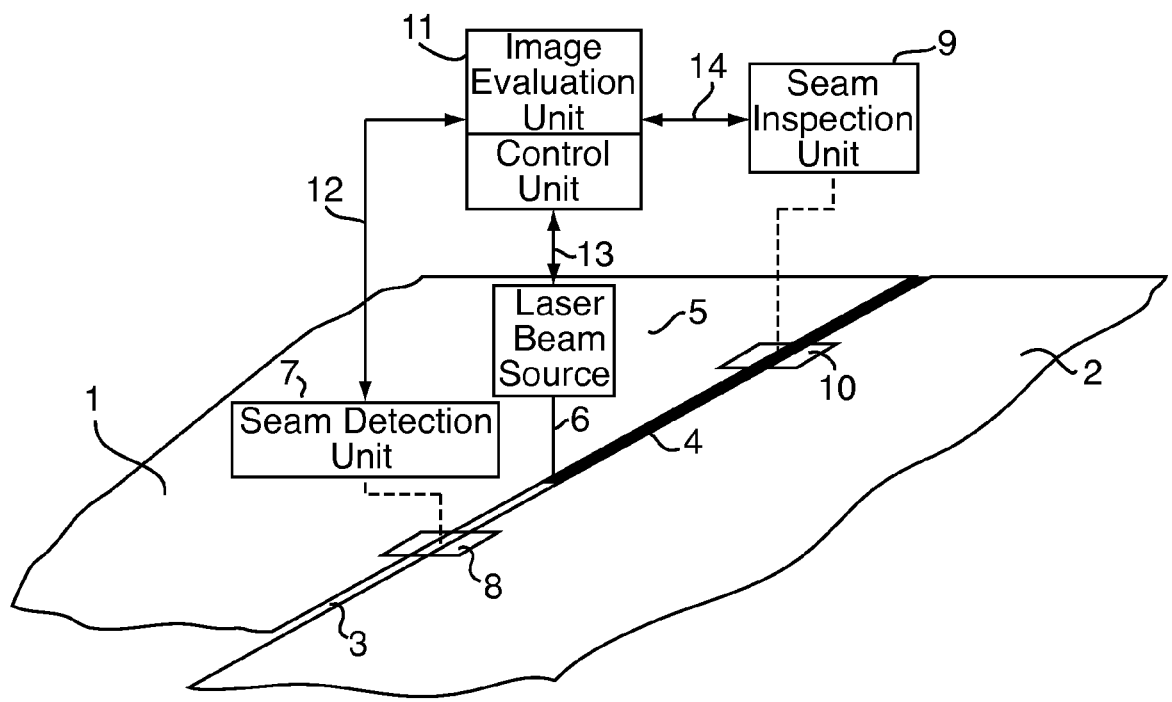
FIG. 1 shows schematically a view of a laser welding operation for welding tailored blanks.

FIG. 1 shows schematically the welding of a tailored blank (Platine) which is made up of metal sheets 1 and 2 butted together along a joint line 3. Sheet-metal components (usually flat) of different thickness and/or different material properties are joined to make a single element, the tailored blank (Platine). Usually this element is subsequently shaped into a component, e.g., a component for a motor vehicle. A laser beam 6 from a laser beam source 5 is guided along the joint line 3, welding the sheets 1 and 2 together and leaving the weld seam 4 behind it. It is immaterial whether the laser beam source 5 moves over stationary workpieces or the workpieces are traversed past a stationary laser. It is known to ascertain the position of the joint line 3 with a seam detection unit 7 in order that the laser beam source 5 and beam 6 can be made to follow the course of the joint line exactly. In a known manner, the course of the joint line 3 is detected by the light section method as described in the introductory remarks. The unit 7, regardless of whether it is state-of-the-art or according to the invention, therefore contains a device for generating at least one light line, in particular a laser light line, substantially at right angles to the course of the joint line 3. The course of the light line is recorded by a camera in order that the joint line can be identified. This is known in principle and does not need further explanation here. The scanned region is indicated in the figure at 8, though not to scale; the scanned region may be say 8×8 mm or 10×10 mm. It is also known in itself to additionally record a grey-level image in the region of the light line, again in order that the course of the joint line 3 can be identified. Corresponding prior art has been mentioned in the introductory remarks. The image obtained by the unit 7 is transmitted by a line 12 to the evaluation unit and control unit 11 (which may also be separate units for evaluation and control), and the position of the laser beam is controlled accordingly, for precise tracking of the joint 3.

To detect the quality of the weld seam 4 after welding, it is normal practice to use the light section method in order to measure geometrical data such as convexity, concavity and edge misalignment. A seam inspection unit 9 is provided for the purpose. The region scanned by this unit is, again, not drawn to scale, and may be say 8×8 mm or 10×10 mm, as region 10 in the figure suggests.

According to the invention, not only is the light section method used, but also a grey-level image is recorded, particularly for the inspection of the weld seam 4, the grey-level image being evaluated to ascertain the quality of the weld seam. This evaluation of the grey-level image should detect, in particular, local defects such as porosity, small holes and incomplete penetration. The unit 9 is configured to generate at least one light line transversely across the weld seam 4. The light line is produced preferably by a light section laser with high optical output (e.g., by 50 mW to 100 mW laser diodes on a narrow line) in order that sufficient light reaches the sensor recording the light line in the unit 9 at all times, allowing for the different surface-reflection characteristics prevailing. The light line sensor in the unit 9 is preferably a CMOS sensor or CMOS camera. Assuming that there is relative motion between the joint to be scanned and the unit 9, as in the example shown in FIG. 1, the exposure time of the camera sensor is preferably made sufficiently long for the reflected light of the laser line to be averaged over a region of the surface. In this way, the 3D reading covers a region greater than the line width of the laser.

To record the grey-level image—basically at the same point on the weld seam as where the laser line is placed across it—the briefest possible flash illumination is made; the exposure time of the illumination should be sufficiently short to keep the motion-blur of the weld seam (which is moving relative to the unit 9 in this example) less than one pixel. Dark-field illumination is preferably used, though bright-field illumination is a possible alternative. Again, the sensor recording the grey-level image is preferably a CMOS sensor; preferably the same sensor as the one recording the laser line. Thus, an image comprising both a grey-level image of the weld seam and the image of the laser line is recorded at brief intervals preferably by means of a single sensor, in particular a CMOS sensor or CMOS camera. The interval between shots is chosen so that the object fields overlap, in other words so that uninterrupted coverage of the seam is assured.

Figure 2:
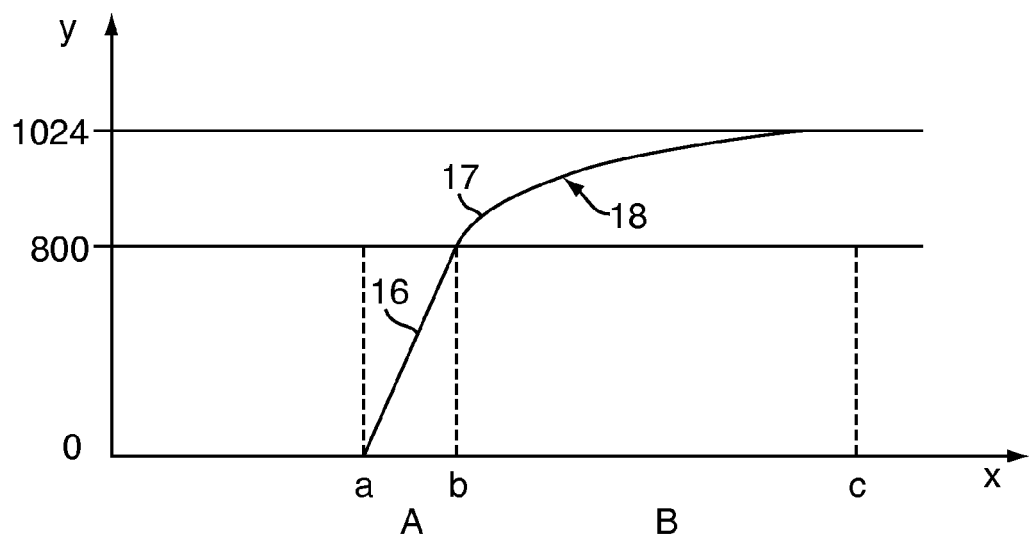
FIG. 2 shows the characteristic of a preferred sensor.
Figure 3:
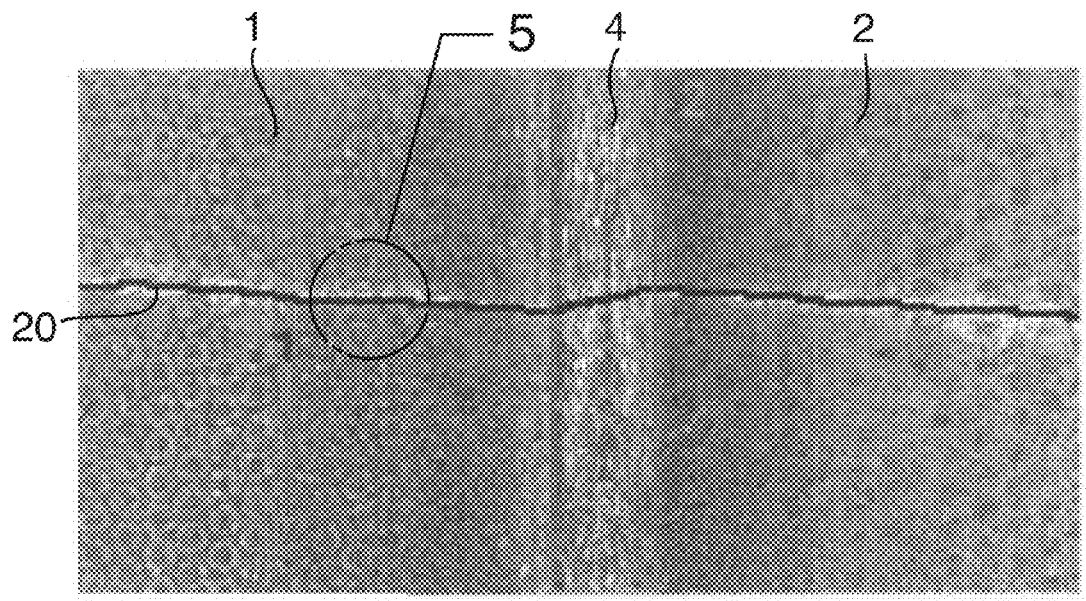
FIG. 3 shows schematically the image acquired by the sensor.

A corresponding photograph revealing the workpieces 1 and 2 and weld seam 4, and the laser line 20, is shown in FIG. 3. FIG. 1 shows schematically the recorded region 10, which is enlarged in the drawing, and is typically say 10×10 mm or 8×8 mm for laser welding of tailored blanks. For quality inspection of the welding of tailored blanks, images are recorded at e.g., 60 images/second. The relative motion between the unit 9 or CMOS camera and the weld seam 4 may be e.g., 500 mm/second. In order to obtain a good representation of the laser section line on the image, and also a good-quality grey-level image that can be used for the quality evaluation of the seam (as will be explained presently), it is preferable that the recording of the laser line and of the grey-level image should have different sensor characteristics. FIG. 2 shows a preferred characteristic, with the intensity of the light incident on the sensor plotted on the x axis, and the corresponding response of the sensor—the sensor output signal—plotted on the y axis as a bit-value. In this example, it is assumed that each sensor output signal consists of a word of 10 bits. It can be seen that for relatively low illumination intensity in the range A or within the segment a-b of the x axis, a linear characteristic 16 is provided. The grey-level image is preferably recorded in this range, yielding a representation with a high dynamic, e.g. in the sensor output signal range a value of 0-800 within the 10-bit word-value range of 0 to 1024. In a further range 17 of the characteristic, or within the illumination intensity range B between the illumination levels b and c, the sensor characteristic is preferably not linear, but logarithmic. This means that the laser line can still be detected when there are large fluctuations in brightness or in the reflection properties of the workpiece surfaces and weld seam. In the example shown, the image of the laser line is output by the sensor in the 801-1024 range of the 10-bit word. It is possible to provide two sensors that have corresponding characteristics 16 and 17 respectively and are arranged in the unit 9 so that they cover substantially the same scanning region 10. Preferably, however, a single sensor is used, with an overall characteristic 18 made up of the characteristic segments 16 and 17. Such a sensor is available on the market from the firm of Photonfocus AG, 8853 Lachen, Switzerland under the type designation MV-D1024 CL80. Thus the sensor's characteristic is adapted so that the diffuse reflection of the flash illumination for the grey-level image falls in the lower, linear range of the sensor response, the illumination preferably being dark-field illumination; the reflected light of the line laser falls in the upper range. The sensor's properties can be exploited so that both types of illumination can be mapped on one image in combination. Using a single sensor brings down the equipment and operator costs, and also maintenance costs. The space requirement and the assembly costs are also markedly lower than for a two-sensor assembly. In place of, or in addition to, a sensor recording a grey-level image, a colour sensor may also be used. This can further enhance the separation of the representation in the image of the light line of the triangulation laser and of the dark-field illumination of the seam through the separation of the wavelengths of the light. If a colour sensor is used, the dark-field illumination preferably lies below 680 nm, and the line laser, above this wavelength.

The images recorded by the sensor are passed to an image evaluation unit 11. At this stage the image is, e.g., as in FIG. 3, but to the evaluation unit 11 the image has to be presented not in a visible representation but merely as a sequence of numbers. Matters can be arranged so that 8-bit words are handled in the unit 11. The separation of the grey-levels of the image can still be effected in the 10-bit image, and the data can subsequently be translated by corresponding tables (lookup tables) into the 8-bit ranges 0-200 (for the grey-level image) and 200-255 (for the laser line).

Figure 5:
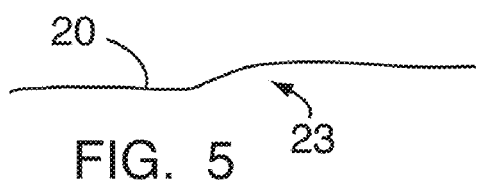
FIG. 5 shows schematically the transverse profile of the weld seam as detected by the light section method.

For the laser line, each image is evaluated in the conventional manner. By means of the laser line, the transverse profile of the seam can be detected, and as is shown in FIG. 5 by way of illustration. From this transverse profile 23, the geometrical data of the seam such as e.g., convexity, concavity and edge misalignment can be detected in a known manner. ISO limits exist for these values, and conformity with these limits is thus recorded. In a novel fashion, the high-quality grey-level image which is supplied by the unit 9 now also allows weld quality to be assessed through evaluation of this image. For this purpose, the contours of the seam structure are highlighted in the image-region which depicts the seam 4.

Figure 4:
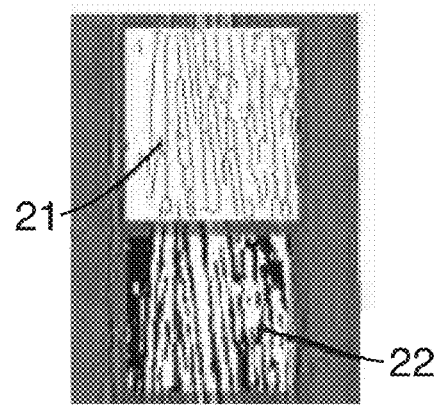
FIG. 4 shows two different processed representations of the image of the weld seam.

This is shown for a seam-segment in FIG. 4. Reference numeral 22 denotes a processing step in which the seam structure is highlighted following dynamic binarization. In a further processing step indicated by the region 21, the dynamically binarized seam region is skeletized. The contour lines of the seam structure remain.

Known image-processing programmes exist for these processing steps. One such known programme, of the firm formerly known as Logical Vision, now Coreco Imaging, St. Laurent, Quebec, Canada, with the designation WiT, is preferred. The version used was 5.3.

By suitable image processing, local defects such as porosity and small holes and incomplete penetration can be detected. One way of doing this is by comparing the structures thus detected as in the regions 21 or 22 with known patterns of good-quality weld seams. An additional or alternative possibility is for the unit 11 to check for the presence of contour lines, their orientation or angular deviation from the longitudinal direction of the seam, and/or their length. In this way, it now becomes possible to inspect the quality of the seam on the basis of a grey-level image.

If a colour image is recorded, a grey-level image again appears after separation of the laser line by wavelength. The weld quality evaluation procedure which has been described remains the same.

The invention has been described with reference to a weld seam made in the welding of tailored blanks, but is not limited to this application. The quality of joints in general can be inspected in this way. For example, a spot weld, or a bead of adhesive, could be so inspected.

The invention can also be used with the edge tracking unit 7. All configurations described in respect of the unit 9 are also stipulated or adopted for the unit 7. In particular the illumination and the image recording are preferably effected as described for the unit 9. The light line evaluation then caters for the edge detection and the monitoring of the jump in thickness. The detection of the edge under conditions of zero gap and zero jump in thickness and the measurement of gap width are preferably performed by the grey-level image evaluation. Here too, the preferred sensor configuration with a both linear and logarithmic characteristic and the preferred type of illumination provide for a grey-level image of very good quality with high resolution, a large object field, and a large dynamic range, notwithstanding high object-velocity, as has not been the case in the state of the art. The unit 7 is likewise connected to the image evaluation unit 11 via a line 12, corresponding to the line 14 for the unit 9. In this case, in keeping with the purpose of the unit 7, the laser source 5 is controlled and/or guided by the unit 11 via the line 13 so that welding by the laser beam takes place at the exact location of the joint line 3. In addition to the detection of position, the unit 7 can also carry out detection of edge damage, and so carry out an evaluation of the quality of the joint before the joining process, as has been described in relation to the unit 9. If the joint is an adhesive bead, detection of position and quality are likewise performed by a unit corresponding to the unit 7 (or separately by two units) before the joining process.

What is claimed is:

1. Method for detecting weld seam quality in welding workpieces comprising the steps of:
   producing at least one light line over a weld seam;
   recording the at least one light line by a camera sensor in order to detect the three-dimensional course of the weld seam and measure geometrical data of the weld seam;
   recording a grey-level image of the weld seam by a camera sensor and a flash light illumination of the weld seam; and
   evaluating the grey-level image for detecting local defects of the weld seam by an image evaluation unit.

2. Method according to claim 1, wherein the at least one light line and the grey-level image are recorded together as one image.

3. Method according to claim 1 wherein:
   the step of recording the at least one light line is accomplished by means of a sensor having a non-linear, logarithmic characteristic; and
   the step of recording a grey-level image is accomplished by a sensor having a substantially linear characteristic.

4. Method according to claim 3, wherein the substantially linear characteristic lies in the range of illumination intensity below that of the non-linear characteristic.

5. Method according to claim 3, wherein the step of recording the at least one light line and the step of recording a grey-level image is accomplished by a single sensor which has both a linear and a non-linear characteristic segment.

6. Method according to claim 1, wherein the step of recording the at least one light line includes generating a sufficiently long exposure time for the at least one light line under conditions of relative motion between workpiece and recording device for the diffuse light of the light line to be reflected by a region of the seam that is wider than the light line.

7. Method according to claim 1, wherein the step of recording a grey-level image includes generating a sufficiently short exposure time for the grey-level image by flash illumination under conditions of relative motion between workpiece and recording device to keep motion blur less than one pixel.

8. Method according to claim 1, wherein the step of recording a grey-level image includes recording at least one of a color image and a grey-level image.

9. Method according to claim 1, further including the step of assessing weld seam quality in the welding of tailored blanks by the image evaluation unit.

10. Method according to claim 9, wherein the step of assessing includes highlighting and examining the contours of the structures of the weld seam.

11. Apparatus for the detection of weld seam quality of welded workpieces comprising:
    a light line projecting unit;
    a flash illumination unit;
    a recording unit configured for recording the light line image and a grey-level image; and
    an image evaluation unit communicating with the recording unit and configured for evaluating the light line image and the grey-level image, the image evaluation unit being adapted to evaluate geometrical data of the weld seam and adapted to evaluate local defects of the weld seam by image processing of the grey-level image only.

12. Apparatus according to claim 11, wherein the recording unit is configured to record an image in which the light line and grey-level image are recorded together.

13. Apparatus according to claim 11 wherein the recording unit includes a sensor having a non-linear, logarithmic characteristic for the light line and a substantially linear characteristic for the grey-level image.

14. Apparatus according to claim 11, wherein the recording unit includes a CMOS sensor having a substantially linear characteristic segment and a non-linear characteristic segment, the substantially linear characteristic segment lying in the low illumination sensitivity range of the sensor.

15. Apparatus according to claim 11, wherein the image evaluation unit is configured for highlighting and evaluating the contours of the joint region in the grey-level image.

16. Method for detecting weld seam quality in welding workpieces comprising the steps of:
    producing at least one light line over a weld seam;
    recording the at least one light line by a camera sensor in order to detect the three-dimensional course of the weld seam and measure geometrical data of the weld seam;
    recording a color image of the weld seam by a camera sensor and a flash light illumination of the weld seam; and
    evaluating the color image for detecting local defects of the weld seam by an image evaluation unit.

17. Apparatus for the detection of weld seam quality of welded workpieces comprising:
    a light line projecting unit;
    a flash illumination unit;
    a recording unit configured for recording the light line image and a color image; and
    an image evaluation unit communicating with the recording unit and configured for evaluating the light line image and the color image; the image evaluation unit being adapted to evaluate geometrical data of the weld seam and adapted to evaluate local defects of the weld seam by image processing of the color image only.

18. Method for detecting weld seam quality in welding workpieces comprising the steps of:
    producing at least one light line over a weld seam;
    recording the at least one light line by a camera sensor in order to detect the three-dimensional course of the weld seam and measure geometrical data of the weld seam;
    recording a grey-level image of the weld seam by a camera sensor and a flash light illumination of the weld seam;
    evaluating the grey-level image for detecting local defects of the weld seam by an image evaluation unit; and
    assessing the quality of spot welds by the image evaluation unit.

19. Method for detecting weld seam quality in welding workpieces comprising the steps of:
    producing at least one light line over a weld seam;
    recording the at least one light line by a camera sensor in order to detect the three-dimensional course of the weld seam and measure geometrical data of the weld seam;
    recording a grey-level image of the weld seam by a camera sensor and a flash light illumination of the weld seam;
    evaluating the grey-level image for detecting local defects of the weld seam by an image evaluation unit; and
    assessing the quality of adhesive beads by the image evaluation unit.

* * * * *